United States Patent
Smith

(10) Patent No.: US 7,270,230 B2
(45) Date of Patent: Sep. 18, 2007

(54) SPECIAL COMPLIANT URETHANE WHEEL

(76) Inventor: Kevin Ray Smith, 1124 Dilts, Chesterfield, IN (US) 46017

( * ) Notice: Subject to any disclaimer, the term of this patent is extended or adjusted under 35 U.S.C. 154(b) by 0 days.

(21) Appl. No.: 11/337,620

(22) Filed: Jan. 23, 2006

(65) Prior Publication Data

US 2006/0189187 A1   Aug. 24, 2006

Related U.S. Application Data

(60) Provisional application No. 60/646,294, filed on Jan. 24, 2005.

(51) Int. Cl.
*B65G 15/14*   (2006.01)
(52) U.S. Cl. ................... 198/604; 198/626.1
(58) Field of Classification Search ............. 198/604, 198/608, 611, 626.1, 626.3, 626.4; 193/37
See application file for complete search history.

(56) References Cited

U.S. PATENT DOCUMENTS

| | | |
|---|---|---|
| 4,312,444 A | 1/1982 | Mushovic |
| 5,023,040 A | 6/1991 | Gajewski et al. |
| 5,139,134 A | 8/1992 | Schenck |
| 5,251,742 A * | 10/1993 | Campbell ................. 198/841 |
| 5,573,103 A * | 11/1996 | Novak et al. .............. 198/604 |
| 5,624,021 A * | 4/1997 | Novak et al. ............ 198/626.1 |
| 5,676,900 A | 10/1997 | Pajtas |
| 5,701,990 A * | 12/1997 | Novak et al. .............. 198/604 |
| 6,595,348 B1 * | 7/2003 | Grasswill et al. .......... 198/604 |

OTHER PUBLICATIONS http://www.urethaneservices.com Applied Urethane Technology, Inc. for special urethane products, including wheels.

* cited by examiner

*Primary Examiner*—James R. Bidwell
(74) *Attorney, Agent, or Firm*—Ritchison Law Offices, PC; John D. Ritchison

(57) ABSTRACT

An auxiliary wheel device that is used with material handling machines. This is a special compliant urethane wheel for use especially in the corrugated cardboard industry. The wheel relates generally to a transfer mechanism that permits the cardboard and other materials to be transferred from a processing line to accumulation devices such as a stacker and shuttle machine. This improved wheel device has a compliant and flexible surface which permits the cardboard units to be temporarily held in place on the conveyor without damaging or marking the units. The special triangular-like configuration of the apertures molded into the wheel provides an improved strength and durability when compared with other compliant wheels.

13 Claims, 9 Drawing Sheets

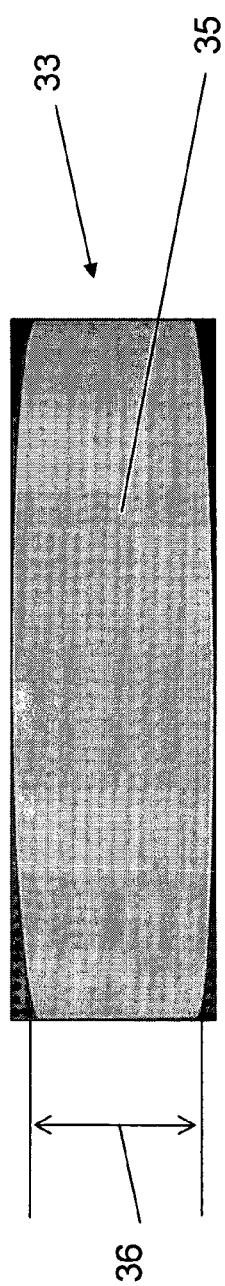
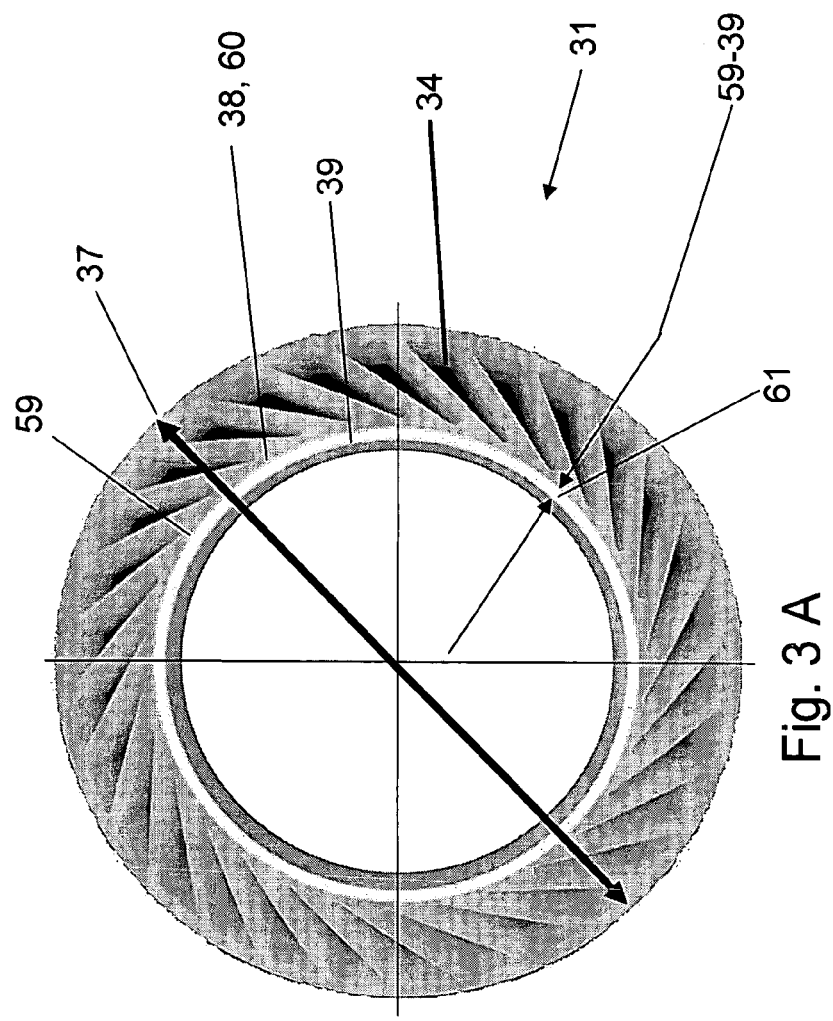
Fig. 3

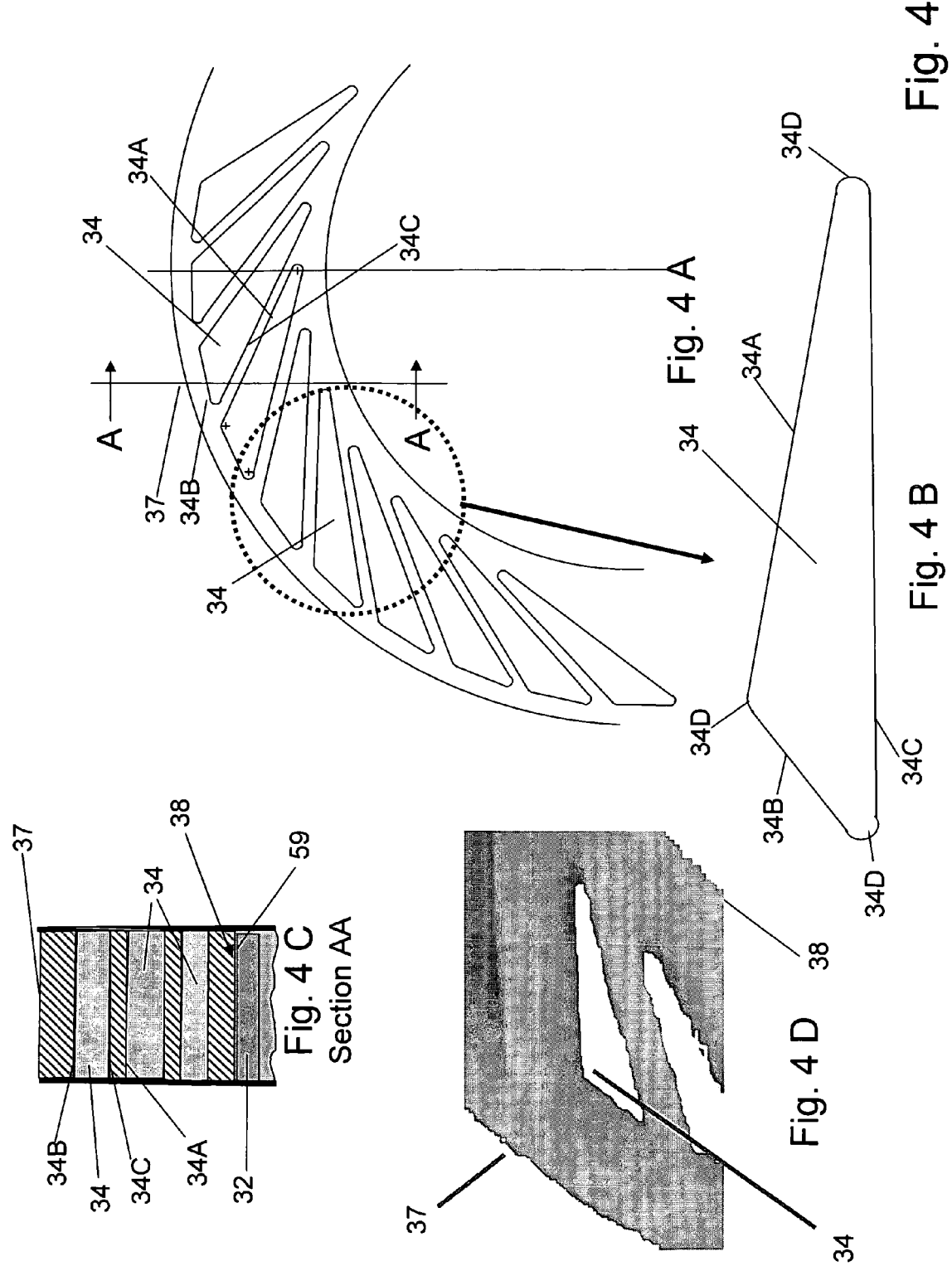

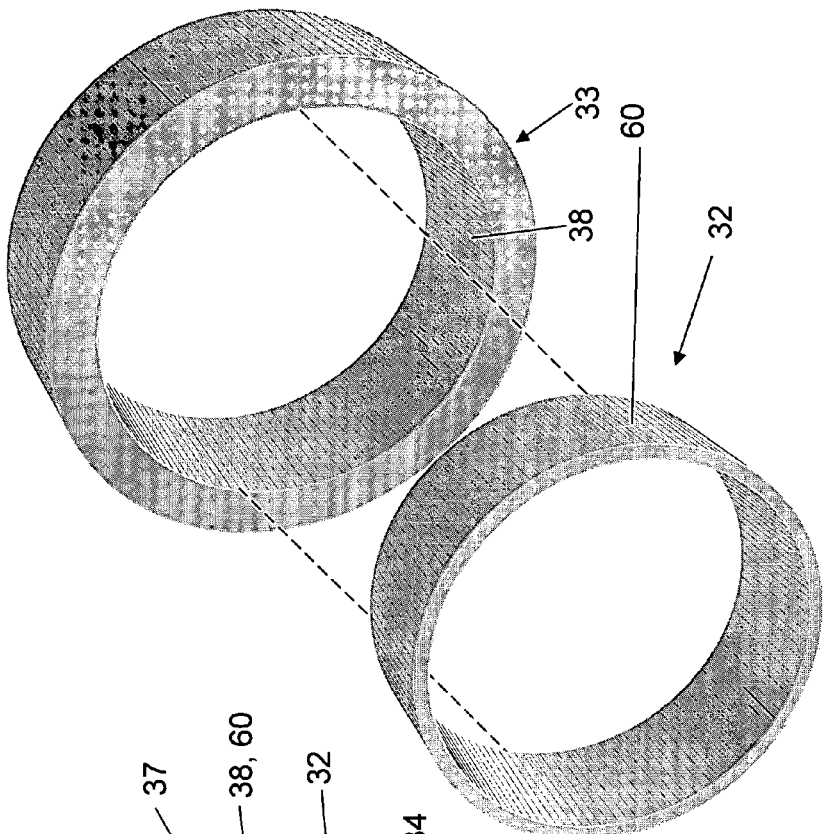
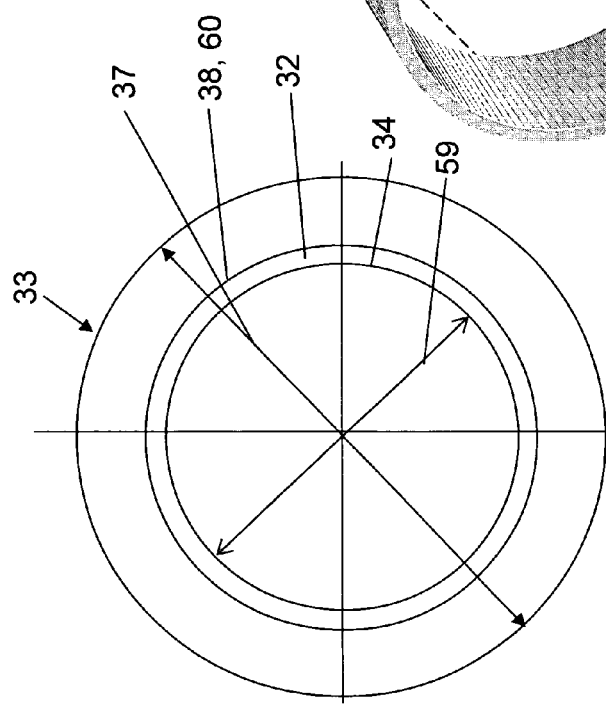
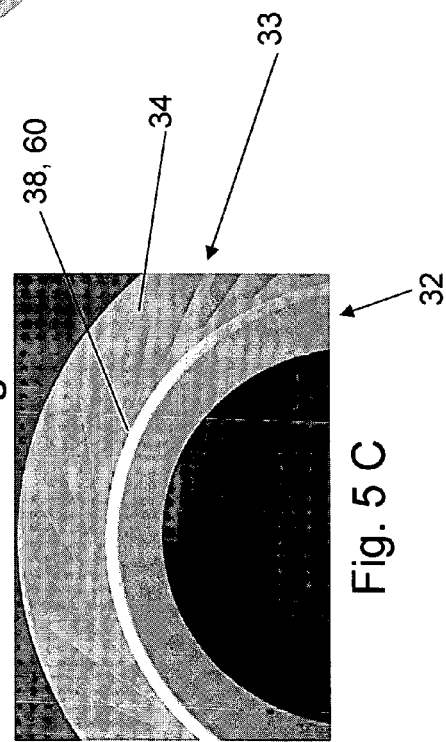
Fig. 5A
Fig. 5B
Fig. 5C
Fig. 5

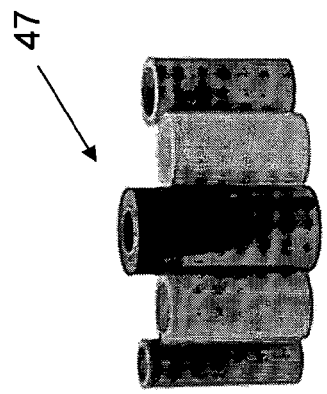
Fig. 7 B
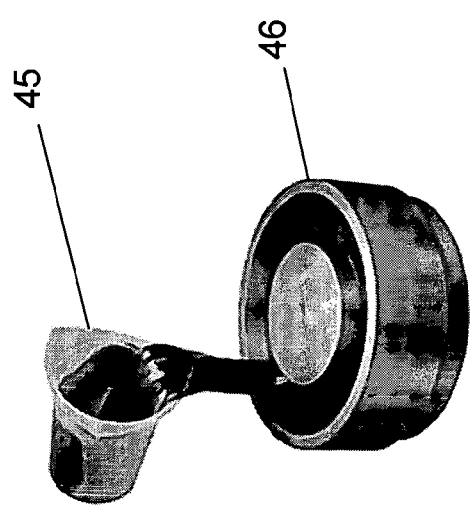
Fig. 7 A
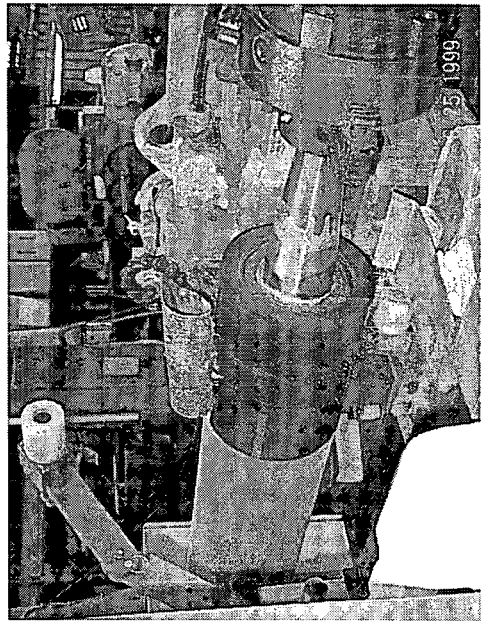
Fig. 7 C
Fig. 7

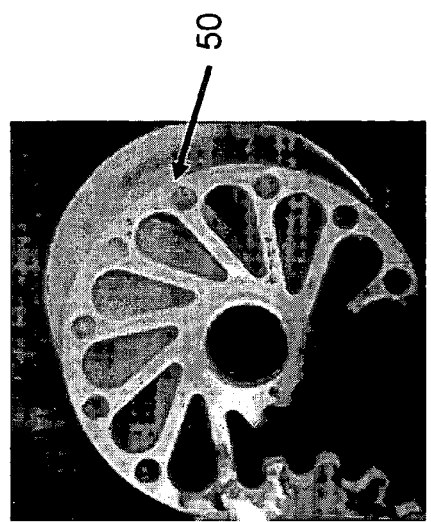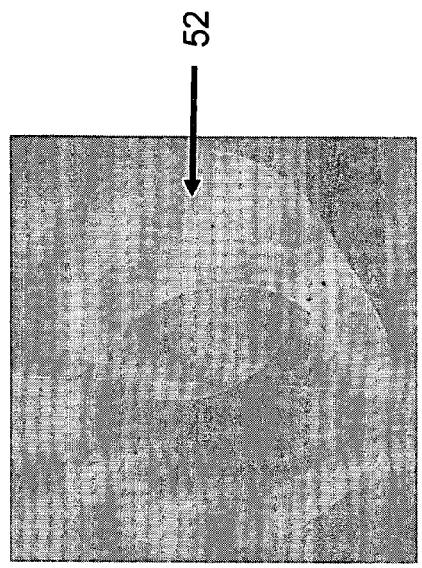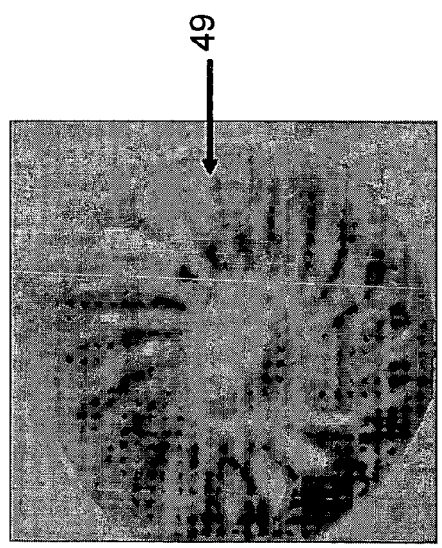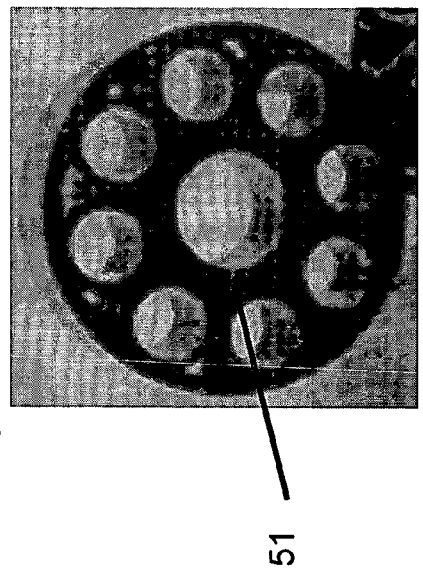
Fig. 8A  Fig. 8B  Fig. 8C  Fig. 8D
Fig. 8

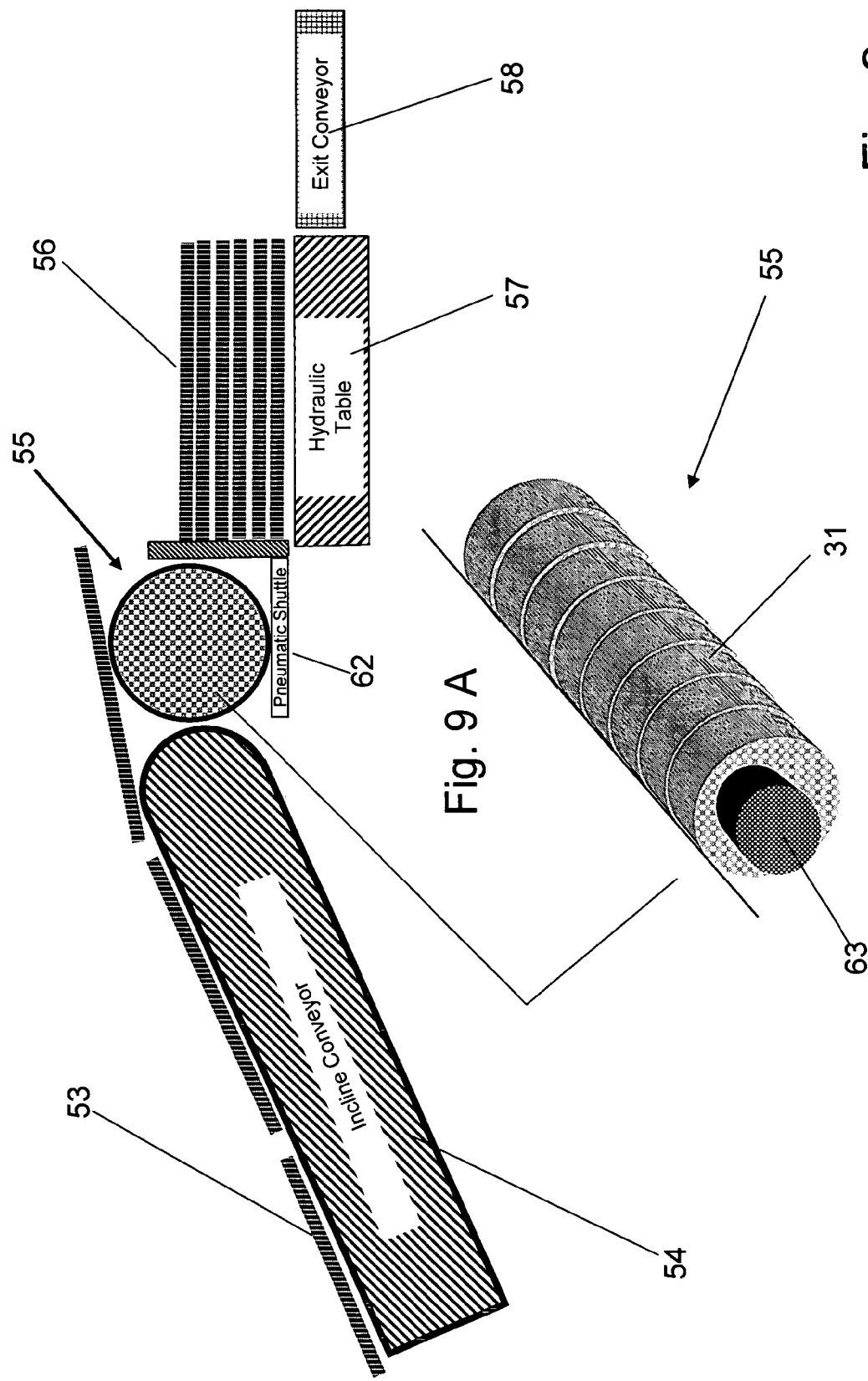

SPECIAL COMPLIANT URETHANE WHEEL

CROSS-REFERENCE TO RELATED APPLICATIONS

This application claims the benefit of Provisional Patent Application Ser. No. 60/646,294 filed Jan. 24, 2005 by Kevin R. Smith and titled "Special Compliant Urethane Wheel for Material Handling".

FIELD OF INVENTION

This invention relates to material handling components, particularly compliant urethane rollers used in the corrugated cardboard industry. The present invention relates generally to a transfer mechanism that permits the cardboard and other materials to be transferred from a processing line to an accumulation devices such as a stacker and shuttle machine. This improved wheel device has a compliant and flexible surface which permits the cardboard units to be temporarily held in place on the conveyor without damaging or marking the units.

FEDERALLY SPONSORED RESEARCH

None

SEQUENCE LISTING OR PROGRAM

None

BACKGROUND—FIELD OF INVENTION

The new Special Compliant Urethane Wheel described in this specification is a material handling components, particularly a compliant urethane roller, used in the corrugated cardboard industry. The present invention relates generally to a transfer mechanism that permits the cardboard and other materials to be transferred from a processing line to an accumulation device such as a cardboard stacker.

A. Introduction of the Problems Addressed

Traditionally, compliant urethane rollers or wheels have been used in handling of various material, including corrugated cardboard and the like. However, the solid wheels were not forgiving to any "jams" and wrecks of the sheets and the variously configured perforated wheels were not firm enough to control the transfer. Likewise, the makers tried to be have a universal direction wheel which often sacrificed the overall durability and needed strength of the wheel. These requirements each limit the use of the traditional wheels for one reason or another. The Special Compliant Urethane Wheel facilitates a clear improvement to traditional wheels and their respective limitations.

Currently to date, auxiliary devices for use with conveyors, particularly in the corrugated box industry, have been complex units which are expensive, sporadic in success, and which require extensive maintenance and repair in order to keep the corrugated line operational. Often these mechanisms require extensive "downtime" for machinery and prolonged maintenance to service the conveyors and material handling machines. Accordingly, it would be advantageous to have a wheel that is durable and stronger and addresses the problems present in other compliant wheels. This improvement would decrease the maintenance needed to repeatedly replace the other types of wheels due to "wear out" and decrease the material "jams" during handling due to a worn out wheel of another configuration than the present invention.

B. Prior Art

Historically, few patented devices have attempted to address the problem as stated. One such device is described in U.S. Pat. No. 4,312,444 (1982) issued to Mushovic which teaches a solid roller for the full length of a shaft or rod. This is a non-pliable roller which does not permit the corrugated sheets to flex and move during a conveyor transfer. Also, when the material wears down, the entire roll requires replacement. The Special Compliant Urethane Wheel permits the sheets to flex and is easily and quickly replaced in sections on a shaft.

Another wheel or tire device is described in a U.S. Pat. No. 5,023,040 which was issued to Gajewski et al (1991) which teaches a non-pneumatic tire. No mention or similar use is described for conveyors and material handling. The open web sections are four-sided polygons, unlike the Special Compliant Urethane Wheel sections of triangular-like configuration.

Another device for a conveyor roller is taught by U.S. Pat. No. 5,139,134 issued to Schenck (1992). This art discloses a flat urethane sheet that is formed around a tubular structure and then connected. The art discusses a "welded" seam that connects the urethane sheet to form a coating or thick "skin" which is effectively a solid sleeve on the outer surface. No description of pliability improvements are taught or anticipated in this device. Unlike the Special Compliant Urethane Wheel the sleeve device appears to be along the entire tube.

Another non-pneumatic tire is shown in the U.S. Pat. No. 5,676,900 issued to Pajtas (1997). The art shown is for a process to make various non-pneumatic tires and as such show various cross sections for the tires or wheels. None shown or taught anticipate the triangular-like configuration described for the Special Compliant Urethane Wheel.

On various web sites for companies selling compliant urethane wheels the typical configurations for such wheels are shown and described. One such is on the Applied Urethane Technology, Inc. site at www.urethaneservices.com. Here are the various cross sections shown and described. These sites show configurations with round and tear-drop apertures through the wheel. None show the improved triangular-like aperture, taught in the description below for the Special Compliant Urethane Wheel, which is stronger and more durable.

Importantly, one skilled in the art appreciates the unusual configuration of the Special Compliant Urethane Wheel. This configuration required serious development engineering and prototype builds and testing to achieve this significant improvement. The configuration now is essentially useful for various sized wheels if the similitude of the configuration of the Special Compliant Urethane Wheel is maintained.

As far as known, there are no devices at the present time which fully meet this need with as few components and superior operation as the present device. It is believed that this device is made with more flexible capability, of a more durable design, and with much improved transfer capabilities than any previous wheel devices.

SUMMARY OF THE INVENTION

A Special Compliant Urethane Wheel has been developed for use by the cardboard processing industry. The industry requires and desires a mechanism or accessory that permits some compliant or flexible transfer between equipment and conveyors that does not slow the transfer of product; does not cause "jams" or process interruptions; does not mark or damage the cardboard products; and is easily maintained and replaced if necessary with a minimum of machinery downtime. The device is comprised mainly of an external compliant urethane wheel with a special configuration; an internal, higher durometer ring which interfaces with the shaft in the material handling system; and various surface configurations on the interior and exterior of the inner ring to improve the connection and interface to both the shaft and the exterior compliant wheel.

The Special Compliant Urethane Wheel device features very few parts. In operation, the Special Compliant Urethane Wheel may be installed and operated without the need of special tools.

OBJECTS AND ADVANTAGES

There are several objects and advantages of the Special Compliant Urethane Wheel. There currently exist few mechanisms for providing a robust transfer of cardboard flats between processing equipment and material handling and conveyor units. In this regard, it would be advantageous to have an improved transfer mechanism which permits the entire system to have a transfer device that permits the cardboard product to have a brief stop in the material flow. Ideally this stop does not interfere (jam) with any of the contiguous systems and does not mar or damage the cardboard product. Additionally, such an improvement to the material handling system should be easily maintained with a minimum downtime to the entire cardboard processing system.

One advantage and object of the present invention is to provide a Special Compliant Urethane Wheel which is versatile. The device is light, variable in size, and easy to use in the field. The device may be quickly removed and re-attached to the material handling system without the use of special tools or the need to wait for glues and adhesives to "cure or set-up". The highly flexible Special Compliant Urethane Wheel provides an easy and fast way for maintenance people to change out the rollers.

The quick changeover, without the need for adhesives, reduces the downtime and increases the uptime of the material handling system hence permitting more run time for the entire cardboard processing system.

Another object for the Special Compliant Urethane Wheel is to provide a device the does not damage the card board pieces being transferred from one process or conveyor to the next. This system reduces "jams" and permits the cardboard to slide over the Special Compliant Urethane Wheel. or to idle on the wheel without tearing or marring the product. The surface between the idle cardboard and Special Compliant Urethane Wheel slips and prevents tears and rips to the transferred cardboard product.

The urethane material also provides another object and advantage in that the urethane provides longer wear between changeovers of the individual wheels. Since the wheel is compliant and flexible, the wheel has less tendency to tear and hence provides a longer life in actual use.

A further help to the overall cost and effectiveness of the system is the ability to change out only the wheels that need immediate replacement. This permits the other wheels to continue in service. This is not the case with prior art wheels that did not have the center hubs and were glued directly to the drive shafts. Normally many urethane and rubber wheels of the prior art types were destroyed during removal and replacement due to their position on the shaft and the need to get to another torn section of the wheel assembly.

Finally, other advantages and additional features of the present Special Compliant Urethane Wheel will be more apparent from the accompanying drawings and from the full description of the device. For one skilled in the art of devices and improvements for material handling and conveyor systems, especially in the cardboard industry, it is readily understood that the features shown in the examples with this mechanism are readily adapted to other types of conveyor and material, handling devices.

DESCRIPTION OF THE DRAWINGS—FIGURES

The accompanying drawings, which are incorporated in and constitute a part of this specification, illustrate an embodiment of the Special Compliant Urethane Wheel that is preferred. The drawings together with the summary description given above and a detailed description given below serve to explain the principles of the Special Compliant Urethane Wheel. It is understood, however, that the Special Compliant Urethane Wheel is not limited to only the precise arrangements and instrumentalities shown.

FIG. 3 including FIGS. 3A and 3B are photographs for the Special Compliant Urethane Wheel with various additional details denoted.

FIG. 4 including 4A through 4D are a group of Drawings that describe the special material handling wheel for the Special Compliant Urethane Wheel.

FIG. 5 including 5A through 5C are a group of Drawings that show the interior ring and exterior roller for the Special Compliant Urethane Wheel.

Figure 6:
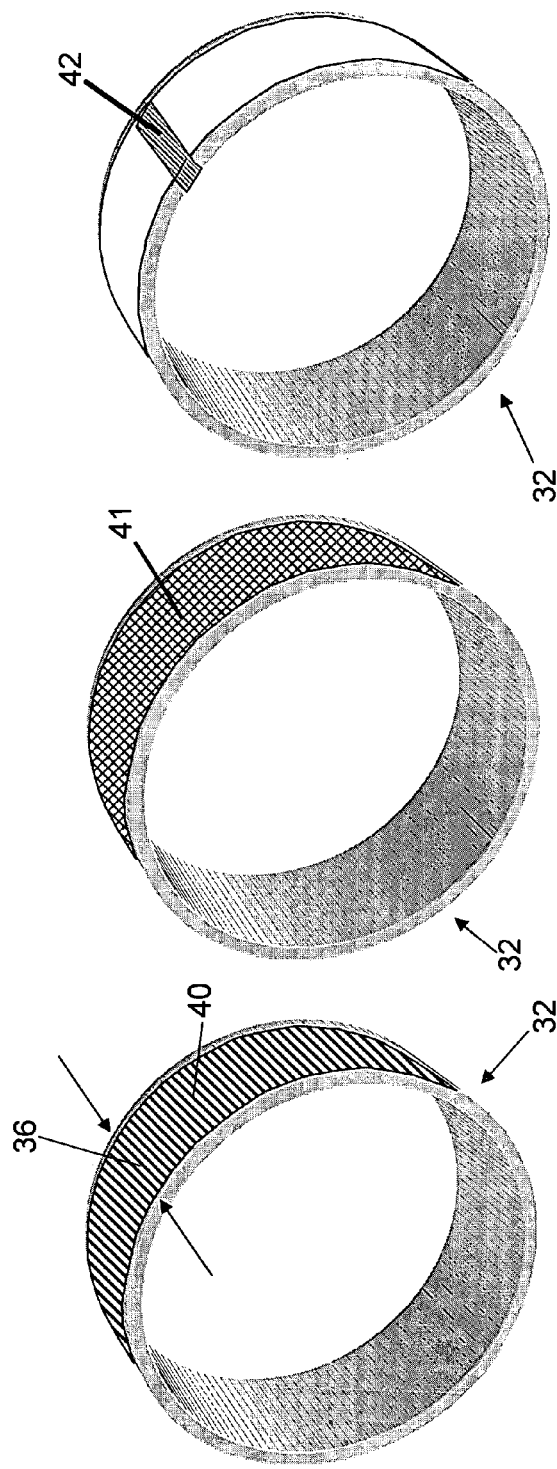

FIG. 6 including 6A through 6E provide details of the external surface preparation for the external surface of the internal ring and external compliant ring.

FIG. 6A demonstrates a smooth surface interference fit.

FIG. 6B demonstrates a rough or smooth ground surface for the interference fit.

FIG. 6C demonstrates a spline fit.

FIG. 6D demonstrates cross knurled fit.

FIG. 6E demonstrates a keyway and key connection.

FIG. 7 including 7A through 7C show part of the processing steps involved with producing the Special Compliant Urethane Wheel.

FIG. 8 including 8A through 8D are Photographs of other devices, each with limitations, known in the industry.

FIG. 9 including 9A and 9B show sketches of the manner how the Special Compliant Urethane Wheel is used in the industrial applications.

DESCRIPTION OF THE DRAWINGS—REFERENCE NUMERALS

The following list refers to the drawings:
31 depiction of the Special Compliant Urethane Wheel
32 high durometer internal ring
33 lower durometer external compliant ring
34 special configured void for compliant ring (33)
34A long base leg of void "triangle" (34)
34B short base leg of void "triangle" (34)
34C hypotenuse of void "triangle" (34)
34D radiused transition between legs
35 external surface of compliant ring (33)

36 variable width of compliant ring (33)
37 variable outside diameter of compliant ring (33)
38 internal surface of compliant ring (33)
39 internal diameter of internal ring (32)
40 spline surface of internal ring (32)
41 cross knurled surface of internal ring (32)
42 keyed connection of internal ring (32) to external compliant ring (33)
43 smooth interference fit of internal ring (32) to external compliant ring (33)
44 ground (rough or fine) surface of internal ring (32) to external compliant ring (33)
45 urethane compound mixture
46 ring mold
47 various finished urethane rollers
48 system to machine/process rollers to required size
49 prior art unidirectional, rounded void roller without hard internal hub
50 prior art omni-directional, rounded void roller and circular voids without hard internal hub
51 prior art omni directional, round voids only without hard internal hub
52 prior art omni directional solid roller without hard internal hub
53 cardboard pieces cut to size
54 inclined conveyor
55 transfer roller assembly
56 stacks of several cardboard pieces (53)
57 hydraulic or pneumatic lift table
58 exit conveyor
59 variable outside diameter of internal ring (32)
60 external surface of internal ring (32)
61 thickness of internal ring (32) [(59) minus (39)]
62 pneumatic, electric or hydraulic shuttle
63 drive shaft

DETAILED DESCRIPTION OF PREFERRED EMBODIMENT

The present device is a mechanism for conveyor transfer device called a Special Compliant Urethane Wheel. 31. This device is comprised essentially of a lower durometer external compliant ring 33 with especially configured voids 34; an high durometer internal ring 32; and an external surface 60 of the said internal ring 32. A person having ordinary skill in the field of material handling and transfer devices such as these appreciates the various materials and configurations that may be used to physically permit this Special Compliant Urethane Wheel 31 to be produced and utilized.

The improvement over the existing art is providing a device that:
  a. is durable, variable in size, and easy to use in industry;
  b. provides a transfer device that is quickly removed and re-attached (compared to prior art) to the overall system;
  c. increases the uptime of the cardboard processing system;
  d. does not damage the card board pieces;
  e. has longer wear between changeovers of transfer components; and
  f. permits the ability to ability to change out only the wheels that need immediate replacement.

There is shown in FIGS. 1-9 a complete operative embodiment of the Special Compliant Urethane Wheel 31. In the drawings and illustrations, note well that the FIGS. 1-9 demonstrate the general configuration of this invention. The preferred embodiment of the device is comprised of only a few parts as shown in FIG. 1-9 of the drawings. These parts include, but are not limited to a lower durometer external compliant urethane wheel 33 with especially configured voids 34; an higher durometer internal urethane ring 32; and an external surface 60 of the said internal ring 32. Various important features of these components are delineated in FIGS. 1 to 9 of the drawings and are described below in appropriate detail for one skilled in the art to appreciate their importance and functionality to the Special Compliant Urethane Wheel 31.

The accompanying drawings, which are incorporated in and constitute a part of this specification, illustrate an embodiment of the Special Compliant Urethane Wheel 31 that is preferred. The drawings together with the summary description given above and a detailed description given below serve to explain the principles of the Special Compliant Urethane Wheel 31. It is understood, however, that the Special Compliant Urethane Wheel 31 is not limited to only the precise arrangements and instrumentalities shown.

Figure 1:
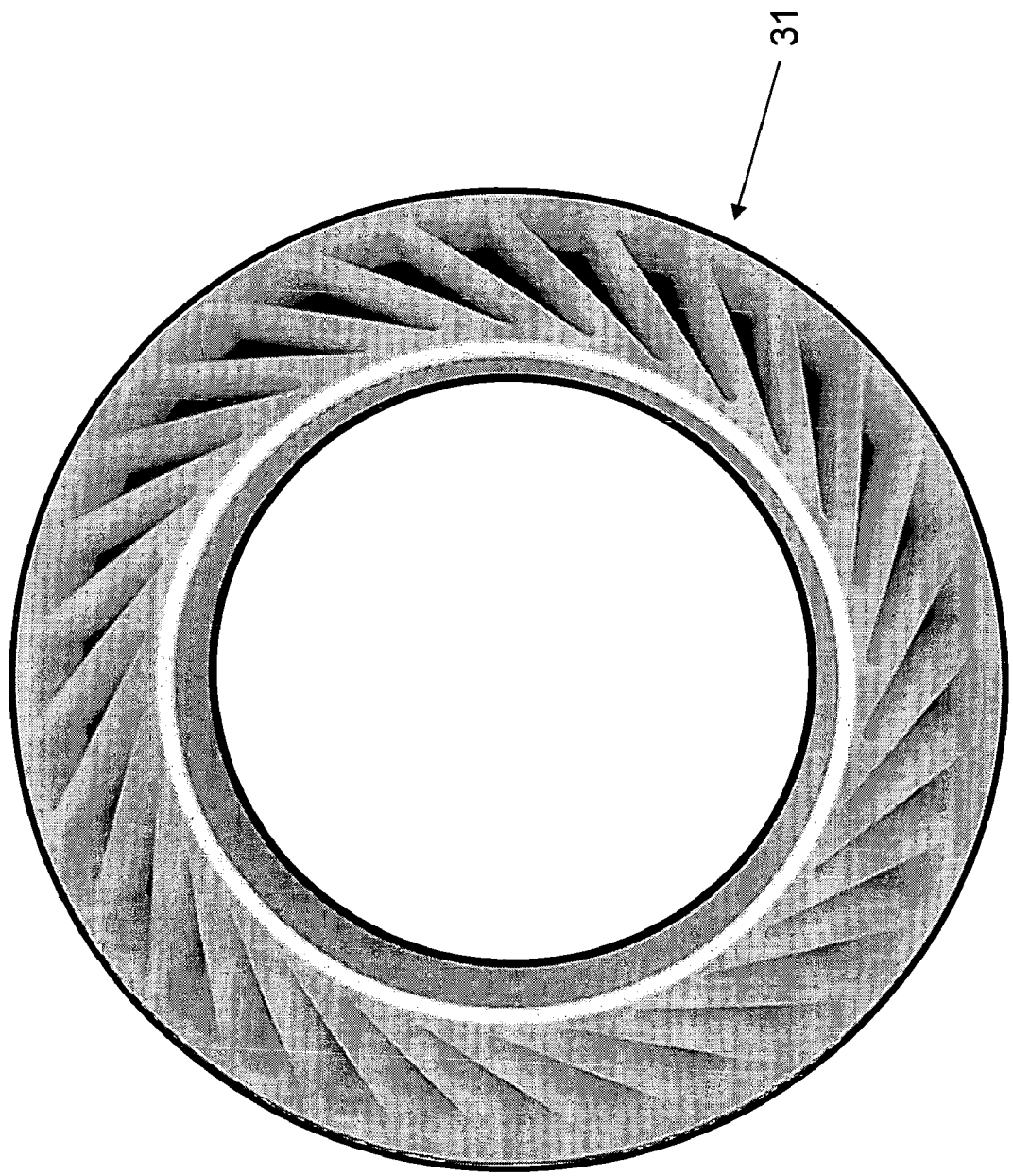
FIG. 1 is a Photograph of the first prototype assembly of the Special Compliant Urethane Wheel.

FIG. 1 is a Photograph of a prototype assembly of the Special Compliant Urethane Wheel 31.

Figure 2:
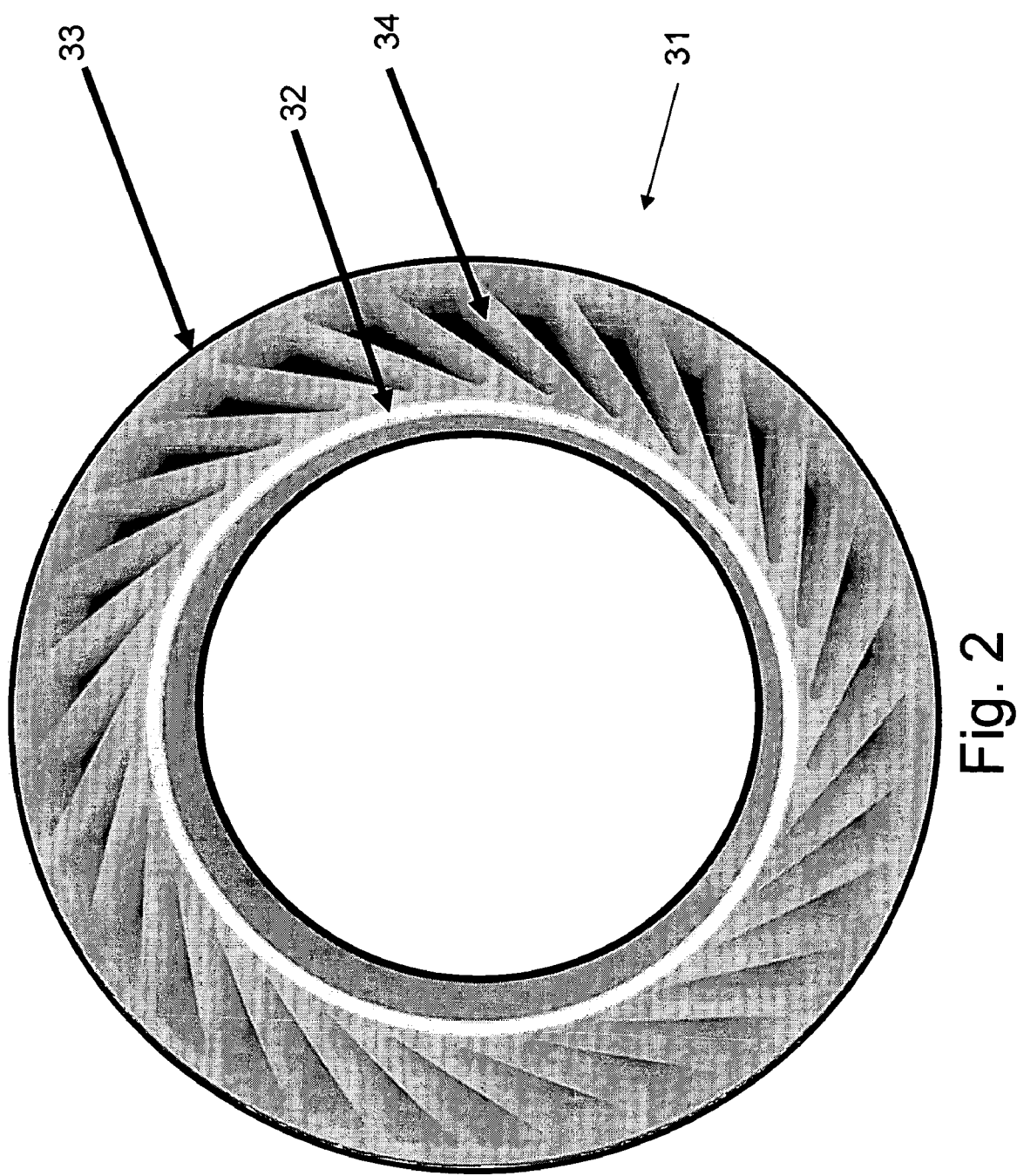
FIG. 2 is a photograph of the Special Compliant Urethane Wheel with the various components noted.

FIG. 2 is a photograph of the Special Compliant Urethane Wheel 31 with the various components noted. Specifically, the higher durometer internal urethane ring 32 and the lower durometer external compliant urethane wheel 33 are depicted. In addition, the multitude or plethora of special configured void 34 for compliant ring 33 are shown. One skilled in the art of urethane mixtures appreciates the ability to achieve the proper durometers and strengths may be accomplished by varying the ratios of the polymers, additives, curatives, urethane and other additive materials. Likewise, one well skilled in urethane devices recognizes the many benefits and improvements of urethane or polyurethanes over other materials. These benefits include but are not limited to those shown below IN Table A:

TABLE A

Characteristics of Urethane

| ITEM | Characteristic |
|---|---|
| 1 | Outlasts Plastics, Steel, Rubber and Aluminum |
| 2 | Is Abrasion Resistant (Non-Marking) |
| 3 | Is Impact Resistant |
| 4 | Is Cut Resistant |
| 5 | Requires Low Tooling cost |
| 6 | Provides High Grip-Good Drive Material |
| 7 | Has Improved Tensile Strength in Elongation |
| 8 | Has better Compression Properties |
| 9 | Provides Load Bearing |
| 10 | Shows many Flex Properties |
| 11 | Is Oxygen & Ozone Resistant |
| 12 | Has High Performance |
| 13 | Is Very Stable (Low Out-gassing) |
| 14 | Maintains Hardness |
| 15 | Maintains Performance for life of product |
| 16 | Has a Long Working Life |
| 17 | Maintains Rebound |
| 18 | Maintains Coefficient of Friction |

FIG. 3 including FIGS. 3A and 3B are photographs for the Special Compliant Urethane Wheel 31 with various details denoted. In FIG. 3A the Front View of a Special Compliant Urethane Wheel 31 is presented. This view shows the high durometer internal ring 32 and the lower durometer external compliant ring 33. Integral to the lower durometer external compliant ring 33 are specially configured voids 34 to provide the compliant, flexible nature for compliant ring 33. The details of the special configured void for compliant ring 34 are delineated below. In addition, the thickness 61 of internal ring 32 (which is the external diameter 59 of the internal ring 32 minus the internal diameter 39 of the inner ring 32) is shown. Plus, in this view, the internal surface 38 for the outer compliant ring 33 and the external surface 60 for the inner ring 32 are shown as the interface line from this Front View.

FIG. 3B shows a Top View picture of the Special Compliant Urethane Wheel 31. Here the external surface 35 of the configuration is demonstrates. Likewise, the variable width 36 of the Special Compliant Urethane Wheel 31 is denoted. This variable width may be determined empirically by the manufacturer of the Special Compliant Urethane Wheel 31 and the user of the wheel in the cardboard industry. Different users of the wheel may want different widths. Depending on the size of the wheel and length of the shaft 63, varying widths 36 of the Special Compliant Urethane Wheel 31 may be desired. For example, and not as a limitation, current industrial uses known for an application of the Special Compliant Urethane Wheels 31 has as few as thirty six (36) and as many as two hundred (200) Wheels 31 in use.

FIG. 4 including 4A through 4D are a group of Drawings that help to describe the special compliant material handling wheel 33 for the Special Compliant Urethane Wheel 31. FIG. 4A is a partial sketch from a Front View of the Special Compliant Urethane Wheel 31. Denoted here are the variable outside diameter 37 of the compliant wheel 33 and the special configured voids 34 integral to the compliant wheel 33. These specially located and configured voids 34 permit the compliant wheel 33 to flex and collapse partially under the weight of the cardboard and then re-establish or rebound to the full dimension of the outer diameter 37 by resiliently rebounding and regaining its original dimension (37). Hence the configuration of the compliant wheel 33 may vary with the corresponding weight of the cardboard. By providing the unique widths 36 of the Special Compliant Urethane Wheel 31 across the transfer point, the sections any tendency for the urethane wheel to stay in a collapsed position is minimized since the load is spread among several individual Special Compliant Urethane Wheels 31.

FIG. 4B is an enlarged view of the special configured voids 34. Each of the special configured voids 34 is essentially an obtuse triangle with all three intersection "points" of the sides (34A, 34B, and 34C) configured with a radiused transition 34D. These radii 34D reduce the stress and potential tearing of the urethane material. One well skilled in the art of mechanics and material science of urethane appreciates that the ratios of the sides (34A, 34B, and 34C) and angles in the obtuse triangle for the special configured voids 34 may be varied to enable different amounts of rebound and resiliency in the compliant wheel 33. As an example and not limitation, the special configured voids 34 shown here have an angle combination of approximately (40-12-128) and a series of sides (2-2.6-0.8).

FIG. 4C is a sketch that is a Cross Section AA from FIG. 4A. Here, the outside diameter point 37 is shown. The various sides (34A, 34B and 34C) are also shown as are the special configured voids 34 for the three sections that are dissected in Section AA. Finally, the interior surface 38 of the compliant wheel 33 and the internal ring 32 are depicted in the sketch. FIG. 4D is an enlarged picture of the special configured voids 34 for the Special Compliant Urethane Wheel 31.

FIG. 5 including 5A through 5C are a group of Drawings and Pictures that show the relationship of the interior ring 32 and exterior wheel 33 for the Special Compliant Urethane Wheel 31. In FIG. 5A, one sees the external diameter 37 for the compliant wheel 33. This diameter 37 is variable according to the need of the transfer point in the cardboard material flow. Likewise, the internal diameter 59 of the internal ring 32 is variable and may be customized to fit the needs of the specific material handling and transfer point of the process in the cardboard industry. The internal interface surface 38 of the compliant wheel 33 and the external surface 60 of the internal ring 32 are shown. The various options to accomplish an effective connection of ring 32 and wheel 33 are fully discussed in the FIG. 6, below. In FIG. 5B an isometric extension shows how the inner ring 32 "telescopes" into the compliant wheel 33. Again the surfaces 38 and 60 are delineated. In fact, the products are molded consecutively so no mechanical "telescoping" is possible. Finally in FIG. 5C a Picture of a partial section of the Special Compliant Urethane Wheel 31 shows the inner ring 32, the compliant wheel 33 and the special configured voids 34.

FIG. 6 including 6A through 6E provide details of the external surface preparation for the external surface of the internal ring 32 and external compliant ring 33. FIG. 6A demonstrates a smooth surface 43 for the exterior surface 60 of the internal ring 32. There is then an interference fit molded in between and the external surface 38 and the compliant wheel 33. This is the preferred embodiment.

FIG. 6B demonstrates a rough or smooth ground surface 44 for the exterior surface 60 of the internal ring 32. This provides an alternative embodiment to the Special Compliant Urethane Wheel 31. Here, the surface 60 has an increased surface area which permits more adhesion between the inner ring 32 and the compliant wheel 33 during the molding process.

Similarly, FIG. 6C demonstrates a spline fit surface 40 for the exterior surface 60 of the internal ring 32. This provides another alternative embodiment to the Special Compliant Urethane Wheel 31. Once again, the surface 60 has an increased surface area which permits more adhesion between the inner ring 32 and the compliant wheel 33 during the molding process. In addition, the spline 40 offers more mechanical transfer strength with the harder inner ring 32 to resist the slippage of the compliant wheel 33 at the junction of the surfaces 60 and 38.

Similarly, FIG. 6D demonstrates a knurled condition 41 of the exterior surface 60 of the internal ring 32. This provides yet another alternative embodiment to the Special Compliant Urethane Wheel 31. Once again, the surface 60 has an increased surface area which permits more adhesion between the inner ring 32 and the compliant wheel 33 during the molding process. In addition, the cross knurl 41 offers more mechanical transfer strength with the harder inner ring 32 to resist the slippage of the compliant wheel 33 at the junction of the surfaces 60 and 38.

In FIG. 6E demonstrates a mechanical key 42 (or series of keys) to the exterior surface 60 of the internal ring 32. This provides still another alternative embodiment to the Special Compliant Urethane Wheel 31. Once again, the surface 60 has an increased surface area which permits more adhesion between the inner ring 32 and the compliant wheel 33 during the molding process. In addition, the keyed configuration 42 offers more mechanical transfer strength with the harder inner ring 32 to resist the slippage of the compliant.

Similarly to the above shown interfaces in FIG. 6 between the inner ring 32 and compliant wheel 33, one skilled in the art of material handling and connecting the drive shaft 63 to the inner ring 32 well appreciates the ability to use a smooth surface 43, keyed connection 42, knurled 41, spline 41 or ground 44 surface to facilitate various ways to attain a good connect. Each of these has advantages and limitations that are well known in the material handling field do not merit additional discussion here.

The following Table B provides an overview of some of the examples of alternative embodiments contemplated by the scope and spirit of this invention.

TABLE B

Contemplated Alternative Embodiments

| Item | Name | Description | Comments |
| --- | --- | --- | --- |
| 1 | Smooth surface 43 | Smooth interference fit between compliant wheel 33 and inner ring 32 | Easy maintenance, no glue or special tools |
| 2 | Keyed connection 42 | One or more keyways and keys fitted between compliant wheel 33 and inner ring 32 or likewise between inner ring 32 and drive shaft 63 | More difficult assembly and process than smooth |
| 3 | Cross knurled 41 | Knurled fit between compliant wheel 33 and inner ring 32 | Straight fit, difficult after first assembly |
| 4 | Spline 40 | Spline fit between compliant wheel 33 and inner ring 32 | Straight fit, may need alignment after first assembly |
| 5 | Ground surface 44 | Interference fit between compliant wheel 33 and inner ring 32 | More difficult assembly and process than smooth |

The details mentioned here are exemplary and not limiting. Other specific components specific to describing a Special Compliant Urethane Wheel 31 may be added as a person having ordinary skill in the field of material handling and conveyor transfer mechanisms (especially for the cardboard industry) well appreciates.

OPERATION OF THE PREFERRED EMBODIMENT

Handling cardboard in the cardboard producing and processing industry requires a reliable and robust system. In any material handling design, engineers, technicians, skilled trades persons, and other professionals know well that the transfer points between conveyors and other processing equipment are the critical places that need special devices that provide the transfer with a high degree of reliability and repeatability. The Special Compliant Urethane Wheel 31 satisfies this need.

The new Special Compliant Urethane Wheel 31 has been described in the above embodiment. The manner of how the device operates is described below. Note well that the description above and the operation described here must be taken together to fully illustrate the full and complete concept of the Special Compliant Urethane Wheel 31.

Important to the operation of the Special Compliant Urethane Wheel 31 is the method and process required to actually manufacture the device. First, this operational description will describe how the Special Compliant Urethane Wheel 31 devices are produced and manufactured. Next, several prior art devices will be briefly described with their inherent limitations to the Special Compliant Urethane Wheel 31. Finally, the manner in which the Special Compliant Urethane Wheel 31 is used in the cardboard industry will be described.

FIG. 7 including 7A through 7C show part of the processing steps involved with producing the Special Compliant Urethane Wheel 31. FIG. 7A demonstrates that the compliant wheel 33 and the inner ring 32 are both produced by a molding process. Each component, the wheel 33 and the ring 32 require individual and specific urethane mixtures 45 which are essentially trade secrets. However, one skilled in the art appreciates the production requires a several step process where the inner ring 32 and the compliant wheel 33 are molded within a precision mold 46. Each step requires a cooling and/or cure time before the next process step is undertaken. Next, after the multi mold and cure steps, various urethane rollers 47 are produced. Each roller is time and temperature cured to a certain final stable state. FIG. 7B shows that eventually, the urethane rollers 47 are produced in various lengths and diameters. Next, these rollers 47 are introduced and processed through a lathe. This is shown by pictures in FIG. 7C. This picture shows that each Special Compliant Urethane Wheel 31 is cut by the turning lathe machine to a specific, desired precision width 36.

FIG. 8 including 8A through 8D are Photographs of other urethane wheel devices, each with limitations, currently known in the industry. In FIG. 8A is shown a prior art unidirectional, rounded void roller 49 without hard internal hub. The unit has less resilience than the Special Compliant Urethane Wheel 31 and must be glued to the surface of the drive shaft 63. In FIG. 8B, another prior art alternative is shown. Here the omni-directional, rounded void roller 50 with additional circular voids is denoted. Again this unit is glued to the drive shaft 63 and has all the limitations aforementioned above—glued to the shaft 63, destruction during change over, long cure times, and a non-slip interface to the cardboard product.

In FIG. 8C, another prior art alternative is shown. Here the omni-directional, round voids only wheel 51 without an hard internal hub rounded void roller is demonstrated. Again this unit is glued to the drive shaft 63 and has all the limitations aforementioned above—glued to the shaft 63, destruction during change over, long cure times and non-slip interface to the cardboard product. Finally, in FIG. 8D, one notes the prior art omni directional solid roller 52 again without an hard internal hub. All of these units lack the flexibility afforded by the compliant wheel 33 and the ease of maintenance and lowered downtime associated with the hard, integral inner ring 32 of the new Special Compliant Urethane Wheel 31.

FIG. 9 including 9A and 9B show sketches of the manner how the Special Compliant Urethane Wheel 31 is used in the industrial applications. FIG. 9A portrays a side view of a common incline conveyor 54 which brings the cardboard pieces 53 up to the transfer roller assembly 55. Here one may see the cardboard piece 53 being transferred across to the awaiting stack 56 of pieces of cardboard 53. Once the controls to the hydraulic table 57 and shuttle 62 "senses" the stack 56 has attained the required weight, the shuttle 62 portion of the hydraulic shuttle and table 57 is urged forward. This movement of the shuttle 62 results in the cardboard stack 56 to be transferred over to the exit conveyor 58 and to continue in the process.

FIG. 9B further shows how a multitude of the new Special Compliant Urethane Wheel 31 are stacked contiguously on the drive shaft 63 to make up the transfer roller assembly 55. The number of Special Compliant Urethane Wheel 31 that make up an assembly 55 varies with the specific conveyor and process. One remembers that the individual Special Compliant Urethane Wheel 31 is slipped onto the shaft 63 and held tight on the said shaft 63. If any one Special Compliant Urethane Wheel 31 is marred or destroyed, it may be removed and replaced without destroying the other Special Compliant Urethane Wheels 31.

With this description it is to be understood that the Special Compliant Urethane Wheel 31 is not to be limited to the disclosed embodiment. The features of the Special Compliant Urethane Wheel 31 are intended to cover various modifications and equivalent arrangements included within the spirit and scope of the description.

What is claimed as new and desired to be protected by Letters Patent is:

1. An auxiliary compliant device for use with a material handling system, comprising:
    (a) an external compliant urethane ring with an internal and an external surface;
    (b) a concentric internal urethane ring with an internal and external surface wherein the internal urethane ring is comprised of a higher durometer urethane as compared to the external ring; and
    (c) a means for connecting the internal and external rings whereby the compliant device is installable to the shaft of the material handling machine and provides a transfer mechanism that is more durable and stronger as compared to other compliant devices.

2. The device according to claim 1 wherein the internal ring configuration is essentially a solid and absent any voids.

3. The device according to claim 1 wherein the external ring is comprised of a urethane material with especially configured voids.

4. The device according to claim 3 wherein the configured voids of the external ring are comprised of a triangularly shaped voids with radiused transitions between the sides of the triangles.

5. The device according to claim 4 wherein the triangularly shaped voids are an angle combination of approximately (40-12-128) with the radiused transitions between the sides of the triangle.

6. The device according to claim 4 wherein the triangularly shaped voids are an angle combination of approximately (40-12-128) with the radiused transitions between the sides of the triangle.

7. The device according to claim 4 wherein the triangularly shaped voids with radiused apexes are a series of sides and angles that empirically result in a highly compliant yet durable device as compared to other compliant devices.

8. The device according to claim 1 wherein the means for connecting the internal and external rings is a roughly ground surface integral to the exterior surface of the internal ring.

9. The device according to claim 1 wherein the means for connecting the internal and external rings is a spline integral to the exterior surface of the internal ring.

10. The device according to claim 1 wherein the means for connecting the internal and external rings is a knurl integral to the exterior surface of the internal ring.

11. An auxiliary compliant device for use with a material handling system, comprising:
    (a) an external compliant ring with a triangularly configured plurality of voids with radiused transitions between the sides of the triangles;
    (b) a concentric and essentially solid internal ring with an internal and external surface; and
    (c) a rough knurl on the exterior surface of the internal ring as a means for connecting the internal and external rings
whereby the compliant device is installable to the shaft of the material handling machine and provides a transfer mechanism that is more durable and stronger as compared to other compliant devices.

12. The device according to claim 11 wherein the external and internal rings are of various diameters whereby the exterior surface of the internal ring and the interior surface of the exterior ring are contiguous regardless of the diameters of the rings.

13. The device according to claim 11 wherein the triangularly shaped voids are an angle combination of approximately (40-12-128) with the radiused transitions between the sides of the triangle.

* * * * *